US008150102B2

(12) United States Patent
Zheng et al.

(10) Patent No.: US 8,150,102 B2
(45) Date of Patent: Apr. 3, 2012

(54) SYSTEM AND METHOD FOR INTERACTING WITH A MEDIA DEVICE USING FACES AND PALMS OF VIDEO DISPLAY VIEWERS

(75) Inventors: Esther Zheng, Irvine, CA (US); Dang Van Tran, Laguna Niguel, CA (US); Richard Whitney, Irvine, CA (US); Jason Rowe, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 889 days.

(21) Appl. No.: 12/199,749

(22) Filed: Aug. 27, 2008

(65) Prior Publication Data

US 2010/0054534 A1    Mar. 4, 2010

(51) Int. Cl.
*G66K 9/00* (2006.01)
*G06F 3/00* (2006.01)
*G06F 13/00* (2006.01)
(52) U.S. Cl. ............................ 382/103; 715/700; 725/37
(58) Field of Classification Search .................. 382/103, 382/114, 115, 116, 117, 118; 348/169, 170, 348/171, 172; 715/700, 961, 962, 972, 978; 725/37, 135
See application file for complete search history.

(56) References Cited

U.S. PATENT DOCUMENTS

| 5,594,469 | A  | * | 1/1997 | Freeman et al. | 345/158 |
| 6,959,109 | B2 | * | 10/2005 | Moustafa | 382/159 |
| 7,627,139 | B2 | * | 12/2009 | Marks et al. | 382/103 |
| 2005/0097478 | A1 | * | 5/2005 | Killian et al. | 715/851 |
| 2009/0217211 | A1 | * | 8/2009 | Hildreth et al. | 715/863 |

* cited by examiner

*Primary Examiner* — Abolfazl Tabatabai
(74) *Attorney, Agent, or Firm* — Beyer Law Group LLP

(57) ABSTRACT

Systems and method which allow for user interaction with and control of televisions and other media device are disclosed. A television set is provided with a face and/or palm detection device configured to identify faces and/or palms and map them into coordinates. The mapped coordinates may be translated into data inputs which may be used to interact with applications related to the television. In some embodiments, multiple faces and/or palms may be detected and inputs may be received from each of them. The inputs received by mapping the coordinates may include inputs for interactive television programs in which viewers are asked to vote or rank some aspect of the program.

22 Claims, 9 Drawing Sheets

US 8,150,102 B2

SYSTEM AND METHOD FOR INTERACTING WITH A MEDIA DEVICE USING FACES AND PALMS OF VIDEO DISPLAY VIEWERS

BACKGROUND OF THE INVENTION

1. Field of the Invention

This application relates to control and interaction with televisions and other media devices.

2. Description of Related Technology

Initially, televisions were controlled using predefined function buttons located on the television itself. Wireless remote controls were then developed to allow users to access functionality of the television without needing to be within physical reach of the television. However, as televisions have become more feature-rich, the number of buttons on remote controls has increased correspondingly. As a result, users have been required to remember, search, and use a large number of buttons in order to access the full functionality of the device. More recently, the use of hand gestures has been proposed to control virtual cursors and widgets in computer displays.

The demands of television viewers for an interactive viewing experience are on the rise. Television shows encourage viewer to call in (or text message) votes and/or rankings based on events that occur during television programs. Although there have been some attempts to allow users to vote interactively by inputting responses into the television using a remote control or some other type of input device, these and other interactive television control schemes have generally suffered from a lack of flexibility, configurability, and user-friendliness.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In a first aspect, a method of providing user control of a media device is provided. The method includes capturing an image of a viewing area related to the media device and detecting the presence and location of a face and a palm in the captured image of the viewing area. The method further includes measuring an angle between the location of the face relative to the palm and generating a control input based on the measured angle.

In a second aspect, a media device having machine-executable instructions stored thereon, which when executed by a processor, perform a method of providing user control of the media device is provided. The method performed may comprise capturing an image of a viewing area related to the device and detecting the presence and location of a face and a palm in the captured image of the viewing area. An angle is measured between the location of the face relative to the palm and a control input is generated based on the measured angle.

In yet another aspect, a television set is disclosed. The television set includes a viewer capture device configured to receive a gesture input directed at the television set. The television set also includes a television control system application configured to detect the presence and location of a face and a palm in the received input, measure an angle between the location of the face relative to the palm, generate a control input based on the measured angle; and control the television based at least in part on the generated control input.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments disclosed herein allow for the control of media display devices based on the relative locations of palms and faces of television viewers. In many of the embodiments described below, the media display device takes the form of a television. The television is equipped with a camera or some other similar device which is aimed at the television viewing area (e.g., the area from which viewers typically watch the television screen). The camera identifies faces and/or palms of the viewers within the viewing area, and maps these faces and/or palms into coordinates. In some embodiments, the coordinates may be (x,y) coordinates based on a vertical and horizontal axes which run along one of the horizontal and vertical borders of the viewing area. Based on the relative location of a viewer's face and his palms, application triggers are generated which allow the viewer to interact with the television. In some embodiments, an angle is measured between the location of the palms of the viewer and the face of the viewer. The angle measurement may be used to determine a value for a user inputted value.

Although the examples described herein generally are provided in the context of television control, a skilled technologist will appreciate that other types of media display devices such as computer displays, digital video players, and other types of display devices may also be controlled utilizing the systems and methods described herein.

Figure 1:
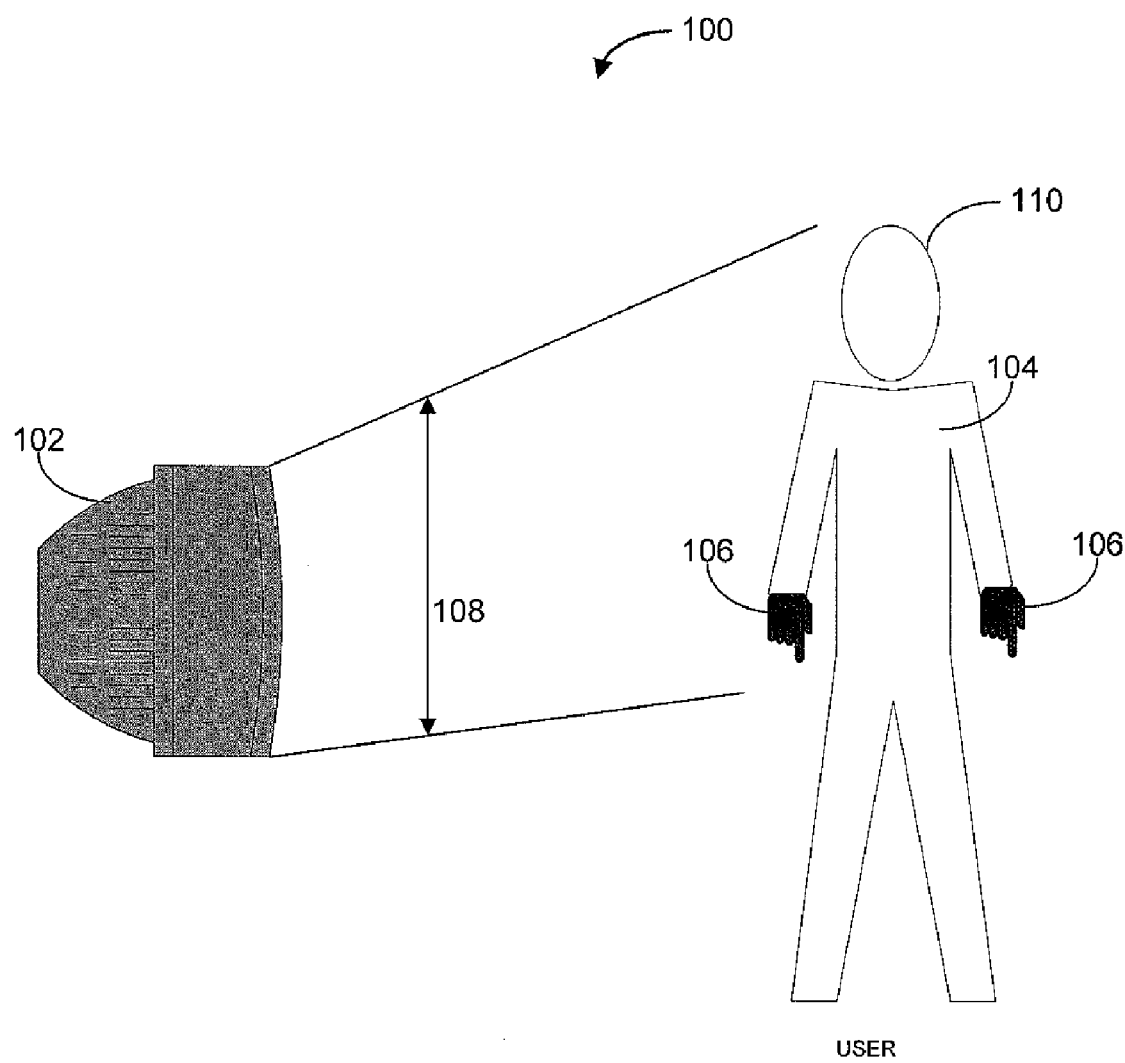
FIG. 1 is an example of an environment suitable for practicing various embodiments described herein.

FIG. 1 is one example of an environment 100 suitable for providing human-television interaction using the techniques described herein. The interaction environment 100 typically includes a television 102 and a viewer 104. The television 102 and the viewer 104 may be relatively positioned in such a way as to provide a substantially unobstructed path 108 between at least some portion of the television 102 and the hands 106 and head 110 of the viewer 104. As will be discussed in more detail in connection with FIGS. 2 and 3, the television 102 typically has a substantially unobstructed path to the hands 106 and head 110 of the user 104 so that gesture capturing devices on the television are able to capture the position and/or movement of the hands 106 and heads 110 of one or more viewers 104 in front of the television.

Figure 2A:
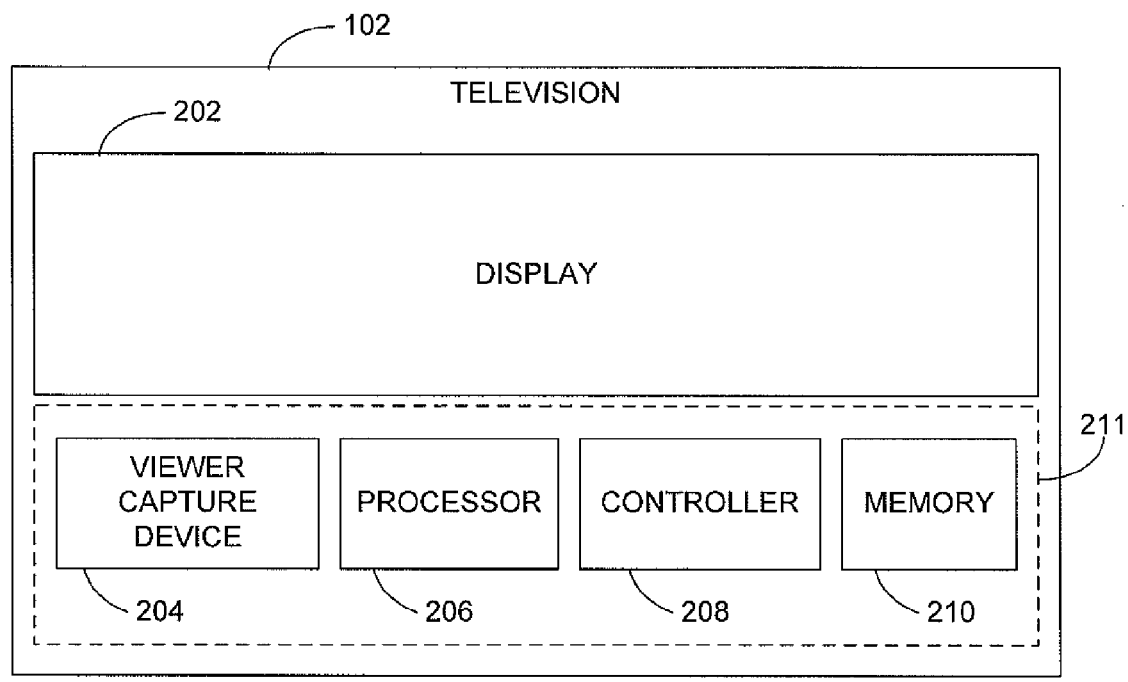
FIG. 2A is a block diagram of a television configured to detect faces and palms in the television viewing area.

FIG. 2A is a more detailed block diagram showing various components of the television 102. It should be appreciated that the block diagram is not intended to show all components of the television 102, but instead provides details about certain components which are typically used to practice various embodiments. The television 102 includes a display 202. The display may be a conventional CRT display, a LCD display, a plasma display, or some other type of television display. The television also includes a viewer capture device 204. The viewer capture device 204 is generally used to detect the presence and location of television viewers 104 in the television viewing area. The viewer capture device 204 may take various forms. In some embodiments, the viewer capture device 204 may be a video camera which captures the position and movements of the hands 106 and head 110 of the television viewers 104. Alternatively, the viewer capture device 204 may take the form of one or more motion sensors which detect the presence, movement, and positioning of the hands 106 and/or heads 110 of the viewers 104.

The television 102 may also include a processor 206. The processor 206 may be any of various types of processors. The processor 206 may be a central processing unit (CPU). Other types of processors 206 may also be used. The television 102 may further include a controller 208. The controller 208 generally receives data from the processor 206 or some other internal device components. The controller 208 may be configured to reformat the received data into a format suitable for scanning across the display 202. In some embodiments, the controller 208 may be associated with the processor 206 as a stand-alone Integrated Circuit (IC). However, the controller 208 may be implemented in various ways. For example, the controller may be embedded in the processor 206 as hardware, embedded in the processor 206 as software, or fully integrated in hardware with the display 202 itself.

Also included in the display device is a memory 210. The memory 210 may also take various forms. In one embodiment, the memory 210 may be dedicated onboard memory that is included with one or both of the processor 206 and the controller 208. Alternatively, the memory 210 may be general purpose memory that is shared with other hardware and software included in the device. The memory 210 may be some form of random access memory (RAM) such as DRAM, SRAM, VRAM, SDRAM or the like, or it may some other form of memory such as flash memory, for example, which may be used to store data. Together, the viewer capture device 204, the processor 206, the controller 208, and memory 210 may form a television control system 211 which allows for a user to control and interact with the television 102.

Figure 2B:
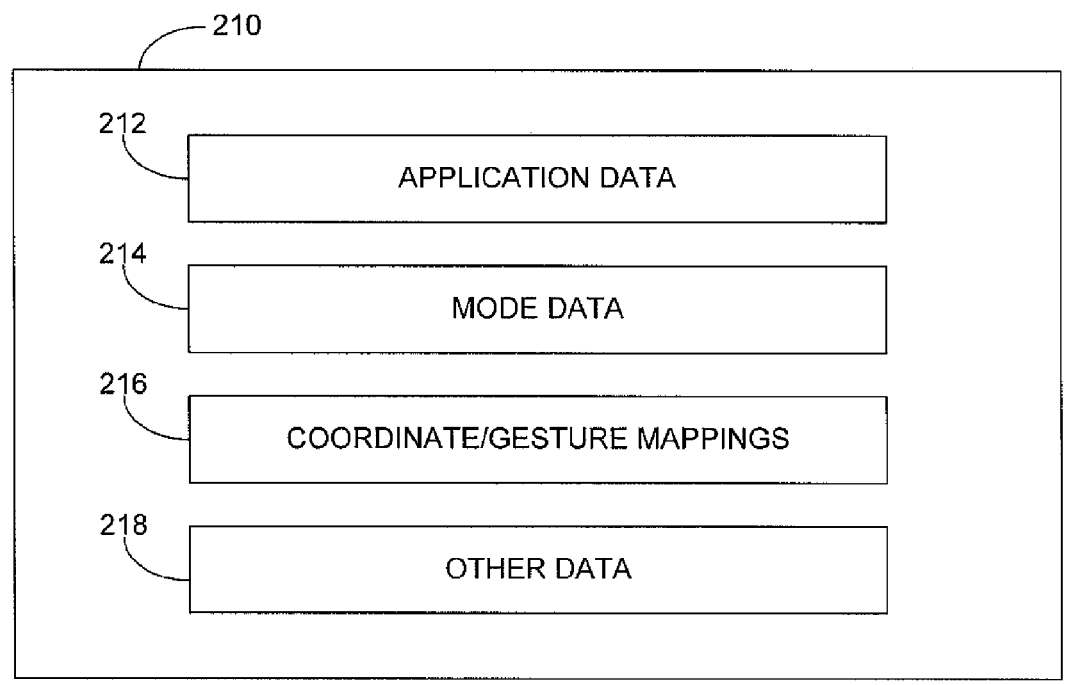
FIG. 2B is a more detailed block diagram of the memory shown in FIG. 2A.

Referring now to FIG. 2B, a more detailed view of the memory 210 is provided. The memory may include various different types of data which may be used to provide viewers 104 with the ability to interact with the television 102 by positioning one or more of their hands 106 in specific positions relative to their face 110. The data stored in the memory 210 may include application data 212. The application data 212 may include interactive application software programs which are designed to be delivered to the user via the television display 202. In some embodiments, the application software programs may be related to interactive television programming which allows the user to interact with a television show. The memory 210 may also store mode data 214. In some embodiments, the television 202 may be configured to interact and receive input from viewers 104 in different ways. For example, various operating modes may be defined in which viewers 104 interact with the television 202 to achieve different operating objectives. For example, a "voting" mode may be defined such that the hand 106 and face 110 positions of the viewers 104 may be used to input votes related to an interactive television program. A "viewership" mode may also be defined which allows the television 202 to determine the number of people watching the television at a given time. Other modes may also be defined and will be described in further detail below. Mode data 214 includes data which may be used to define different operating modes in which the applications 212 stored in the memory 210 may operate. Also stored in the memory 210 may be coordinate mapping data 216. The coordinate mapping data 216 may take the form of mapping tables which associate hand 106 and face 110 positions with specific inputs that may be used to control the television or interact with an application 212 running on the television. Example of coordinate mapping tables will be described in additional detail below. The memory 210 may also store other data 218. The other data 218 may include an operating system, non-related application software, media storage, or some other data.

Although the illustrative television 102 has been described with reference to a particular configuration in FIGS. 2A and 2B, a skilled technologist will readily appreciate that the television 102 may take many forms and configurations. Moreover, the television 102 may include various other system components not described herein which provide other features generally applicable to the television 102.

Figure 3:
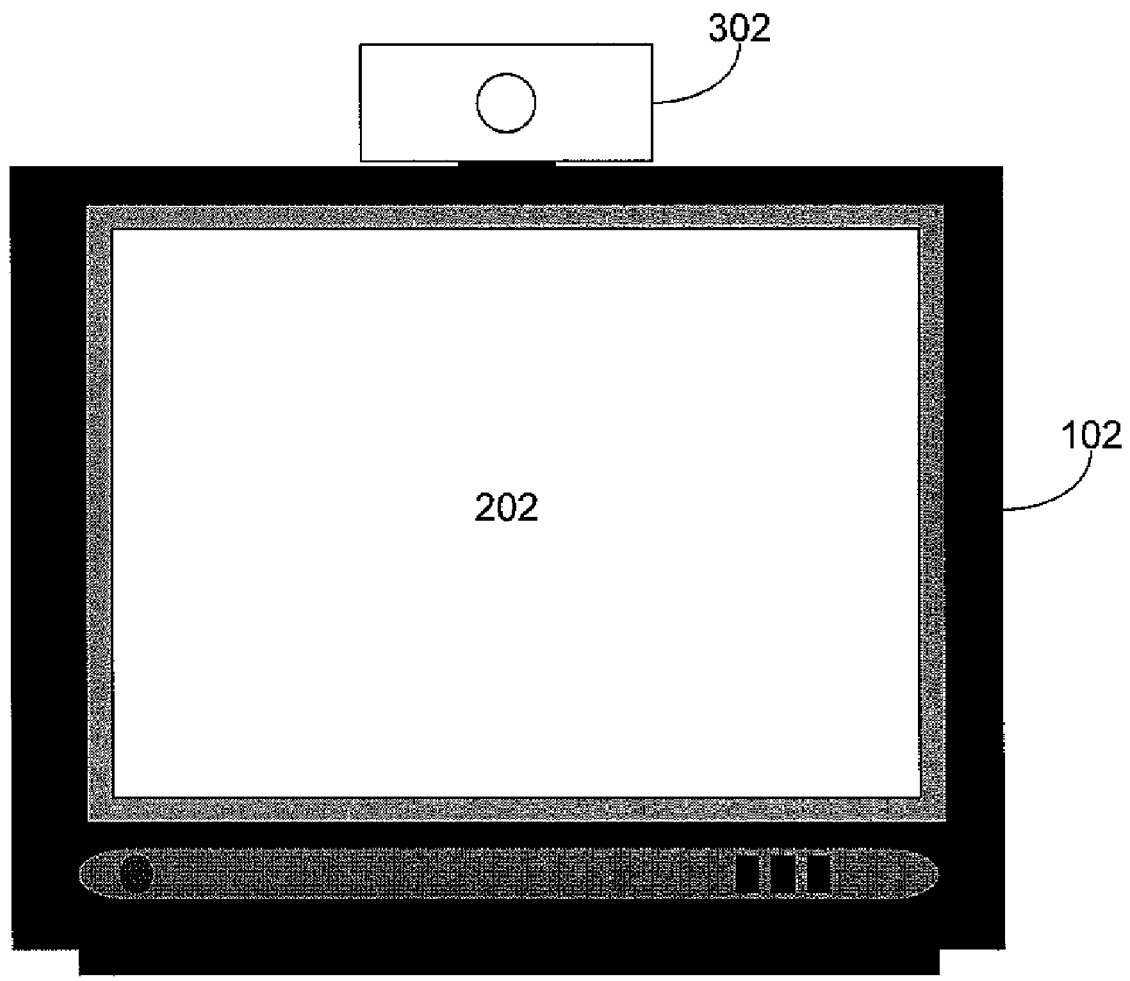
FIG. 3 is an example of a television equipped with viewer capture devices in accordance with one or more embodiments.

FIG. 3 is an example of a television 102 with a camera-based viewer capture device. As shown in the figure, television 102 includes a camera 302 which is positioned in such a way that it faces the same general direction as the display 202. The camera 302 need not be a particularly sophisticated camera device, and may have resolution capabilities roughly similar to a "webcam" as is well-known in the computer field. The use of a lower resolution camera is feasible in this context because the camera does not need to be able to recognize faces 110 of the viewers 104. Rather, the camera 302 only needs to be able to detect the location of faces 110 and hands 106 of the viewers 104. Of course, more sophisticated and technologically advanced cameras may also be used. The camera 302 typically has an operating range in which the location and movement of the hands 104 and head 110 of viewers 104 may be captured by the device 302. In some embodiments, the camera may be configured to detect and process the relative location of the hands 106 of a viewer 104 with respect to the head 110 of the same viewer 104. Although specific exemplary viewer capturing configurations has been shown in FIG. 3, a skilled technologist will appreciate that other types of configurations may be used to receive and process hand and face positions received from the viewers 104. For example, the television 102 may include sensors to detect and capture viewer position coordinates, or it may include some other type of viewer capture device 204.

Figure 4:
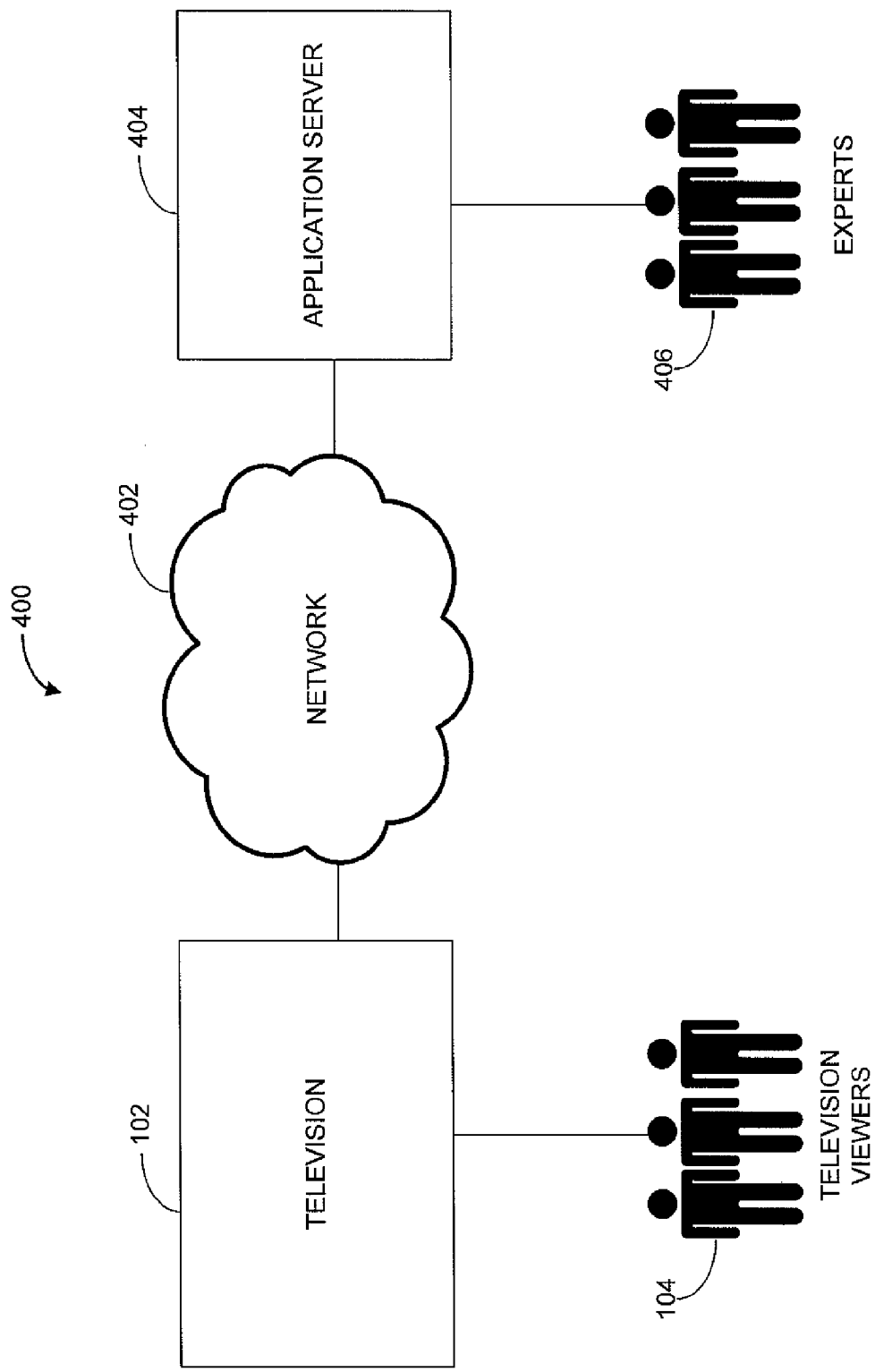
FIG. 4 is an example of a network environment suitable for the implementation of certain embodiments described herein.

In some embodiments, the application data 212 may include interactive television applications that are delivered to the television via a network. FIG. 4 is an example of a network environment 400 suitable for the implementation of certain embodiments described herein. As shown, the network environment 400 includes a computer network 402 which allows data to be transmitted to the television 102 from an application server 404. The application server may store interactive television applications which are delivered to the television via the network 402. The network 402 may be a cable television network, an IP-based network, a satellite network, or some other type of network. In some embodiment, the interactive television applications delivered from the application server 404 may be created by experts 406. Experts 406 are typically skilled programmers who are tasked with designing interactive television applications 406. The experts 406 may be given priority access to the application server 404 in order to be able to configured the server 404 to operate properly on the network 402.

Figure 5:
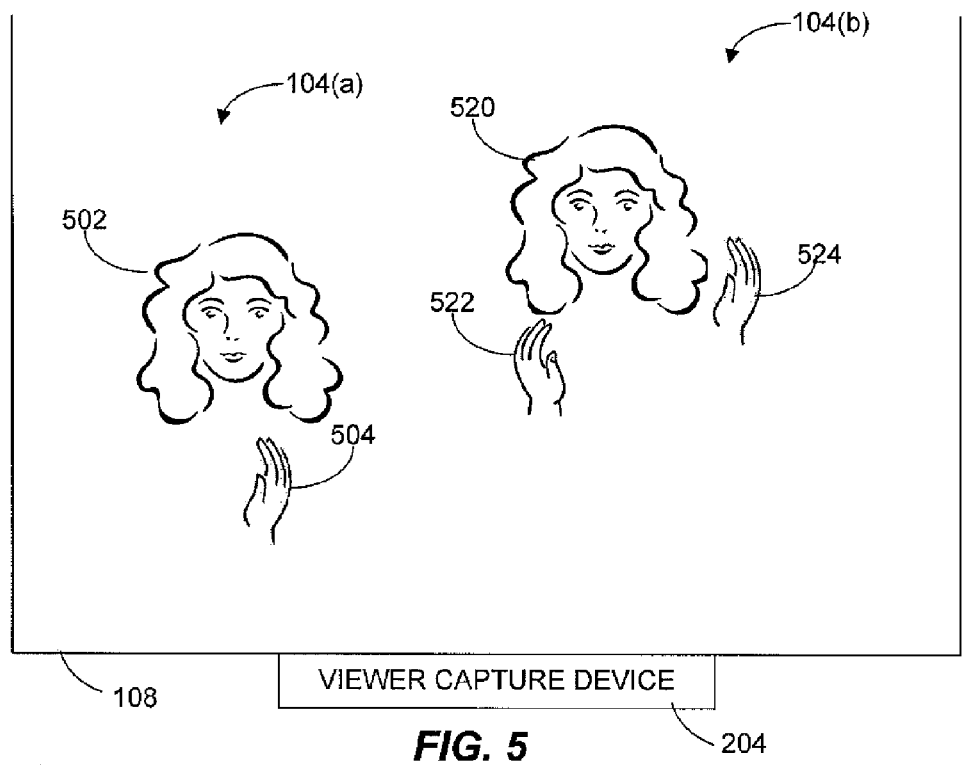
FIG. 5 are examples of face and palm positions that may be measured and/or detected by the viewer capture devices.
Figure 6:
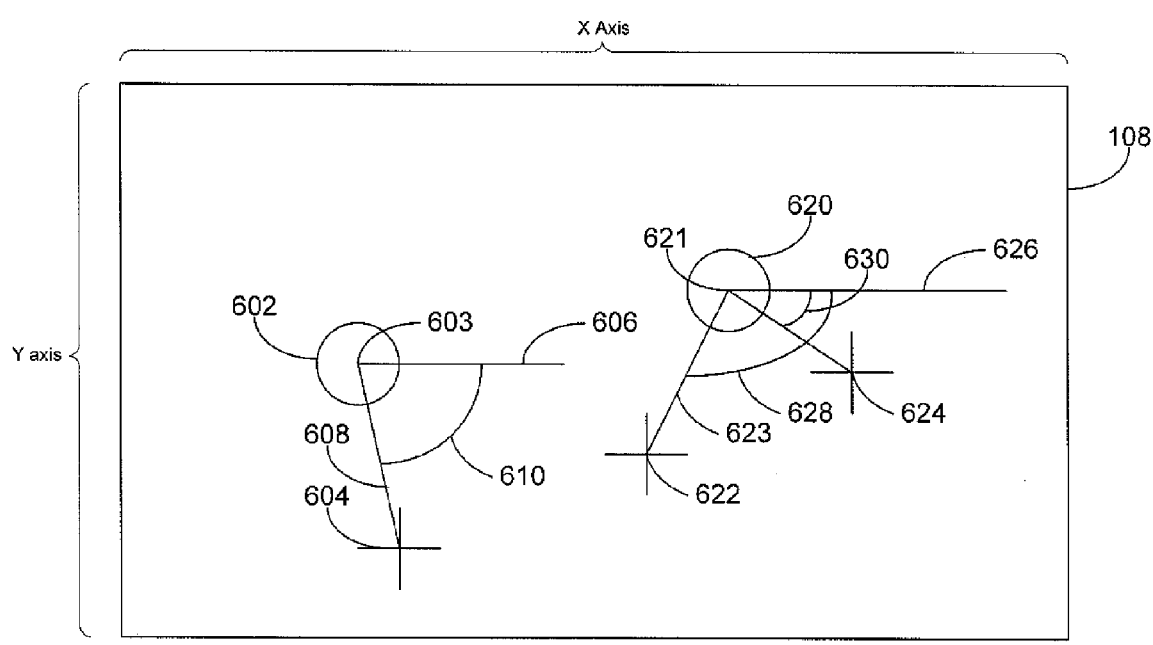
FIG. 6 is an example of face coordinates, palm coordinates, and angle calculations which may be generated based on the face and palm position data captured by the viewer capture device.

The applications delivered from the application server 404 via the network 402 may be generally configured to receive inputs from television viewers 104 based on the position of the palms 106 of the viewer relative to their faces 110. As discussed briefly above, the position of the hands 106 and faces 110 of the viewers 104 may be mapped into coordinates which are translated into specific inputs which control or others interact with the television 102. FIGS. 5 and 6 provide an illustration of how the viewer capture device 204 may detect the location of viewers watching the television 102 and map the location of their hands 106 and faces 110 into coordinates which may be used to control an interactive television application.

Referring to FIG. 5, two viewers 104(*a*) and 104(*b*) are positioned within the television viewing area 108 and within the range of the viewer capture device 204. The viewer capture device 204 (which may be the camera 302) can detect the faces and palms of each of these viewers. As shown, the viewer 104(*a*) on the left has raised one of her palms 504 into a position underneath her face 502. Her other palm is not visible which may mean that it is not raised. The second viewer 104(*b*) has raised both of her palms 522 and 524 to positions relative to her face 520 that may be captured by the viewer capture device 204. The viewer capture device 204 may detect the locations of the faces and palms of the viewers 104(*a*) and 104(*b*) and then generate coordinates indicative of their location within the viewing area. Advantageously, the viewer capture device does not need to be able to detect specific features of the viewers 104(*a*) or 104(*b*), and is only configured to detect the presence of the faces and palms of the viewers 104(*a*) and 104(*b*). By not requiring the viewer capture device 204 to be able to recognize particular facial features, a more simple face detection algorithm (that is less resource intensive) may be employed which needs only to recognize those faces present within the viewing area 108.

FIG. 6 is an example of face coordinates, palm coordinates, and angle calculations which may be generated based on the face and palm positions captured in FIG. 5. In the example shown in FIG. 6, a circle 602 represents the location of the face 502 of the first viewer 104(*a*) within the viewing area 108. The center of the circle 602 includes a vertex 603 from which a line 606 extends along a horizontal axis from the vertex 603. A crosshair 604 represents the position of the palm 504 of the viewer 104(*a*) with respect to the face 502 of the viewer 104(*a*). A line 608 extends from the vertex 603 to the crosshair 604. The horizontal lines 606 and the crosshair line 608 extending from the vertex 603 create an angle 610. This angle 610 may be measured and then mapped and/or translated into a corresponding control input into the television 102. The angle may be measured as the degrees from horizontal of the crosshair line 608. For example, if the crosshair line 608 extends above the horizontal line 606, the angle may be a positive value (between 0 and 180 degrees). If the crosshair line 608 extends below the horizontal line, the angle may be a negative value (between 0 and 180 degrees). A skilled artisan will readily appreciate that various angle measurement techniques may be utilized. The mapping/translation process will be described in additional detail below.

The second viewer 104(*b*) from FIG. 5 is also represented in the diagram of FIG. 6. The head 520 of the second viewer 104(*b*) is represented in FIG. 6 as the circle 620. At the center of the circle 620 a vertex 621 has a horizontal line 626 extending from it. This horizontal line is used to generate angle measurements based on the locations of the palms 522 and 524 of the second viewer 104(*b*). The location of the first palm 522 of the second viewer 104(*b*) is represented by the crosshair 622. A line 623 from the vertex 621 extends to the crosshair 622, creating an angle 628 between the horizontal line 626 and the line 623. This angle 628 may be measured to determine a relative location of the palm 522 to the face 520 of the second viewer 104(*b*).

As noted above, in this particular example, the second viewer 104(*b*) is gesturing with both palms. The second palm 524 is therefore also mapped as shown in FIG. 6. The location of the second palm 524 is represented in FIG. 6 by the crosshair 624. A line extends from the vertex 621 to the cross hair 624 which creates a second angle 630 between the crosshair 624 and the horizontal line 626 which extends from the vertex 621. This angle 630 may be may measured to determine a relative location of the palm 524 to the face 520 of the second viewer 104(*b*). The angle measurements may be performed based on coordinates assigned to the palms and faces of the viewers captured in the image. In some embodiments, the coordinates may represented as vectors assigned based on the location on an X axis and Y axis defined for the image as shown in FIG. 6. As can be appreciated by a skilled artisan, additional viewers 104 may be present in the viewing area 108 at any given time. The faces 110 and palms 106 of several viewers may be captured by the viewer capture device 204.

As noted above in connection with FIG. 2, various different operating modes may defined for the television control system 211 in which viewers 104 interact with the television 202 to achieve different operating objectives. FIGS. 7-10 below provide example processes by which various different operating modes may be implemented according to one or more embodiments.

Figure 7:
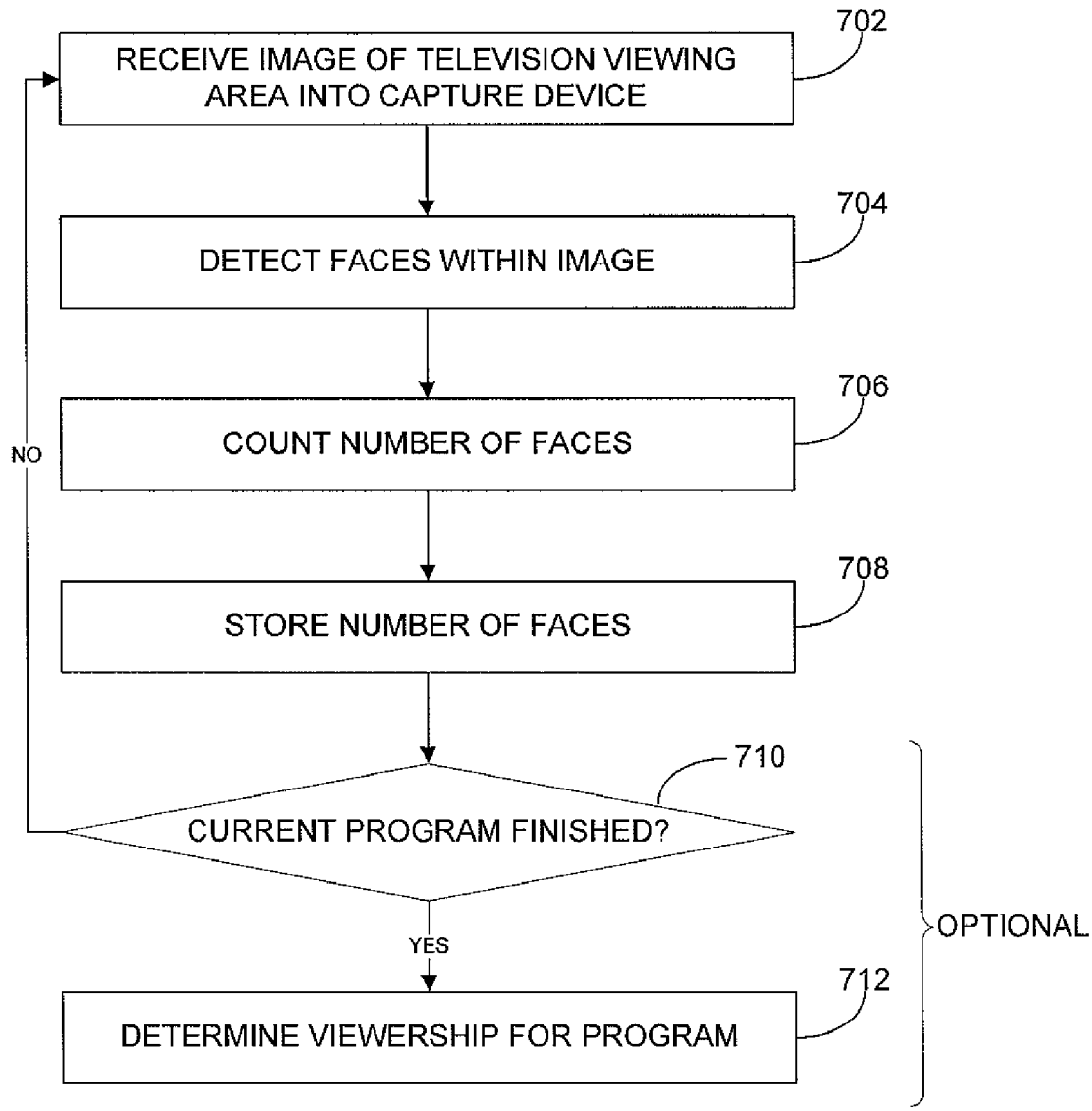
FIG. 7 is a flowchart providing an example of a process by which viewership can be measured for a television program by detecting viewer faces in the television viewing area.

Turning to FIG. 7, a flowchart provides an example of how the television 102 may be configured to operate in a viewership mode that measures television viewership. The process begins at block 702 where an image of the television viewing area 108 is received into the viewer capture device 204. As noted above, in some embodiments, the viewer capture device 204 may be a camera 302 associated with the television 102. In a viewership mode, the image of the television viewing area 108 may be captured by the camera 302 and stored in the memory 210. The image may be stored as raw image data. The image may also be converted into a bitmapped image or some other image file format for processing. The process then moves to block 704, where faces 110 of viewers 104 are detected within the image. The image stored in the memory 210 may then be processed using image processing software configured to detect faces within an image. The image processing software may be commercial face detection software such as Luxand FaceSDK, OpenCV, or some other type of facial detection software. This software may be stored as computer instructions in the memory 210 on the device which are executed by the processor 206 and/or the controller 208.

As noted previously, the image processing software does not need to be able to recognize individual facial features of the viewers 104, but rather needs only to be able to detect the presence of a face. Once the faces have been detected within the captured image, the number of detected faces may then be counted at block 706. The number of faces counted may be stored in memory 210. Thus, the number of viewers watching the television at a specific time is recorded by the system 211. In some instances it may be desirable to determine viewership throughout the duration of a television program. Determining viewership of a program throughout its duration may be useful for purposes of determining television ratings for the program. In these instances, options blocks 710 and 712 may allow for viewership to be measured at time intervals during the course of a program. At decision block 710 it is determined whether current program has completed.

If the current program is not finished, the process returns to block 702, and an updated image of the television viewing area may be captured by the viewer capture device 204. This process may be repeated several times during the course of a program, so that viewership is more accurately determined over the duration of the program. If, at decision block 710, it is determined that the current program has finished, then the process moves to block 712 and the overall viewership for the program may be calculated by the system 211. In one embodiment this calculation may simply take the total number of viewers counted, divided by the number of times that the viewing area 108 was captured by the viewer capture device 204.

Figure 8:
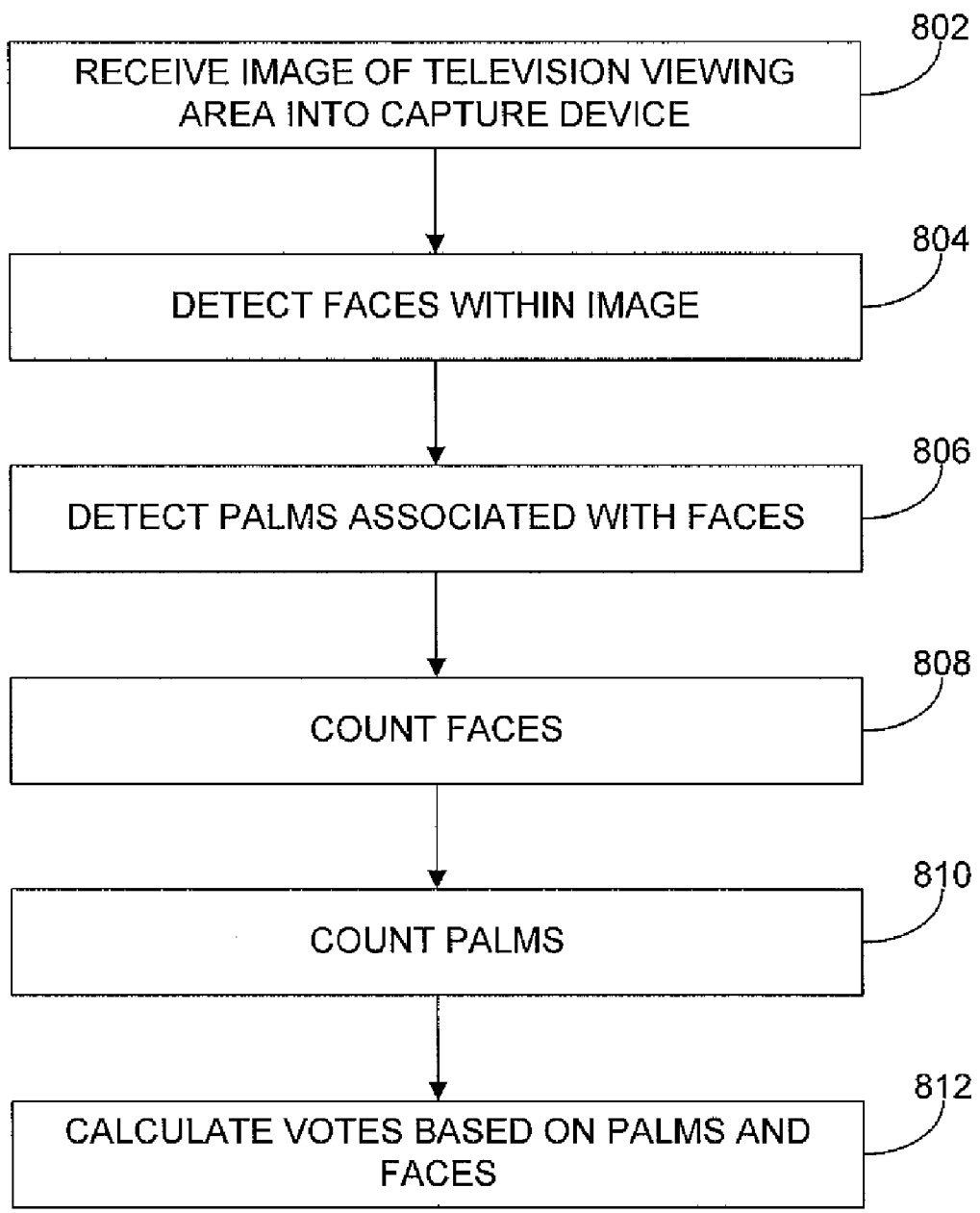
FIG. 8 is a flowchart providing an example of a process by which viewer votes may be counted based on face and palm position data.

Another mode that the system 211 may operate in is a vote counting mode. Many television programs today rely on viewer voting. As one well known example, the television program "American Idol®" eliminates contestants based on viewer voting. FIG. 8 is a flowchart providing an example of a process by which viewer votes may be counted based on face and palm position data using the television control system 211. The process begins at block 802, where the viewer capture device 204 receives an image of the television viewing area 108. Next, the process moves to block 804 where the television control system 211 detects the presence of faces 110 of viewers 104 within the image. Next, the palms 106 of the viewers 104 are also detected in the captured image at block 806. Once the palms have been detected, the television control system 211 may then count the number of faces detected within the image at block 808 and the number of palms at 810. Once the number of palms and faces has been counted, viewer voting may be determined in block 812 based on the palms and faces detected and counted.

In some embodiments, an interactive television application may be configured to operate in conjunction with a television broadcast that is presented on the display 202 of the television 102. The interactive television application may be stored as application data 212 in the memory 210 of the television 102. As noted previously, application data 212 may be delivered from the application server 404 over a network 402 to be stored in the television 102. In some embodiments, the application may be run from the server 404 with the television 102 acting as a client in a client/server implementation. To provide on specific example, a television broadcast may include a competition in which contestants are judged according to their performances during the broadcast. In one embodiment, the interactive application may be configured to display a message on the television screen after each contestant's performance. The message may state, for example, "if you would like to vote for this contestant, raise your hand now." Alternatively, the message could be presented as a voiceover message for the television program. The viewer capture device 204 may then capture the palms 106 and faces 110 of the viewers as described in connection with FIG. 8 above. The votes for each contestant may be transmitted to the application server 404 over the network 402 and counted accordingly. Of course, other implementations of a voting mode may be envisioned.

Figure 9A:
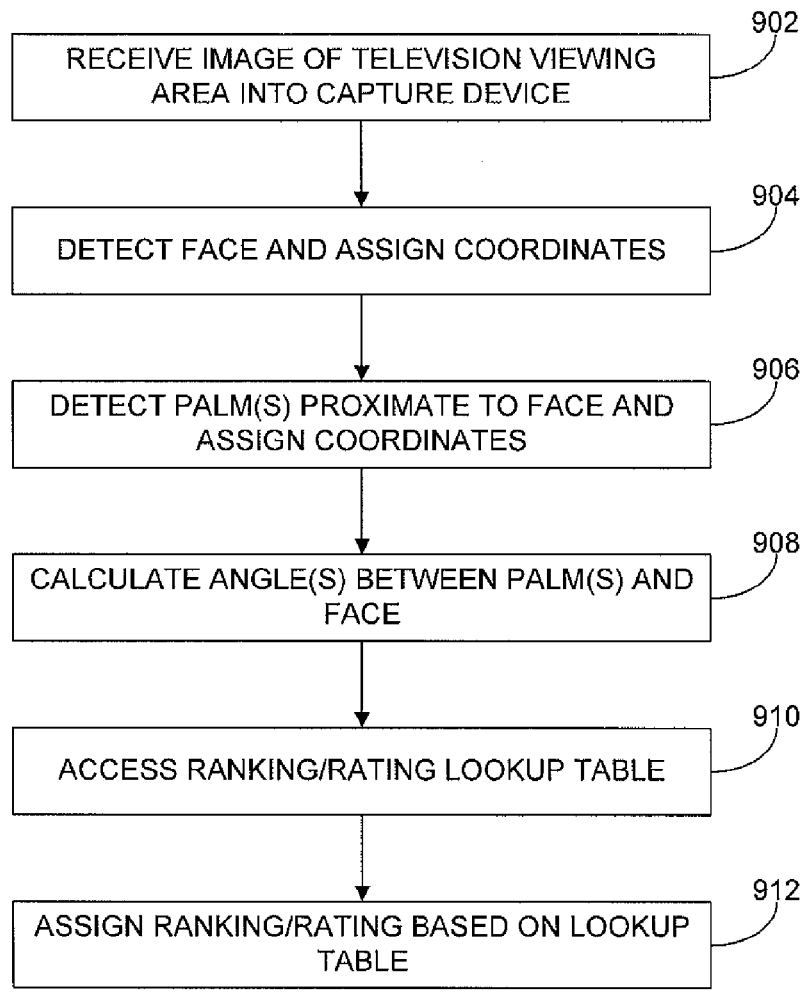
FIG. 9A is a flowchart providing an example of a process by which viewer rankings may be captured based on face and palm position data.

In addition to capturing viewer voting, the television system 210 may be configured to collect more detailed information form the television viewers. For example, a rating mode may be defined in which one or more viewers 104 may input a specific ranking by locating their palm (or palms) 106 in a specific position relative to their face 110. FIG. 9A is a flowchart providing an example of a process by which viewer rankings may be captured based on face and palm position data. The process begins at block 902, where viewer capture device 204 captures an image of the television viewing area 108. In some embodiments, the viewer capture device 204 may take a picture of the viewing area 108 and store the image in the memory 210 on the television. The process then moves to block 904, where the television control system 211 detects faces 110 of the viewers 104 in the captured image and assigns coordinates values to those faces 110. In one embodiment, the horizontal top side boundary of the viewing area 108 as captured in the image may form an "x" axis, and the vertical left side boundary of the viewing area 108 may form a "y" axis. The location of the faces 100 detected within the captured image of the viewing area 108 may be assigned (x,y) values based on their location on each of the respective axes. In some embodiments, the coordinates may be based on pixel locations within the image, with the image being dividing into a grid with each pixel in the image representing a square in the grid. Thus, if the viewer capture device 204 captures an image with 1024 horizontal pixels and 768 vertical pixels, the coordinate values may be based on the specific pixels at which the faces 110 are located. A face in the top left corner of the captured image may be assigned a coordinate with very low x and y values, e.g., (20,10) while a face in the lower right corner of the image may be assigned a coordinate value with high values, e.g. (1006,748).

Once the faces have been detected within the captured image, the process then moves to block 906, where the palms in the captured image are detected by the system 211 and assigned coordinates based on their location within the captured image. These coordinates may also be (x,y) coordinates based on the location of the palms 106 on the "x" and "y" axes. Once the coordinates have been assigned for the detected palms, the process then moves to block 908 where the angles between the faces and their associated palms are calculated. In some embodiments, the angles may be calculated by creating one or more right triangles from the (x,y) coordinates of the face 110, palm 106, and a horizontal line extended from the face 110, and using trigonometric calculations to determine the angles.

Once the angles between the palms 106 and the faces 110 have been determined, the system 211 may access a ranking/lookup table which maps measured angles to specific application inputs at block 910. This lookup table may be stored in the memory 210 of the television 104 and an example of a lookup table is provided below in Table 1.

TABLE 1

| Angle Measurement | Score/Ranking |
|---|---|
| +30 to +90 degrees | Rating 5 (out of 5) |
| +10 to +30 degrees | Rating 4 (out of 5) |
| −10 to +10 degrees | Rating 3 (out of 5) |
| −30 to −10 degrees | Rating 2 (out of 5) |
| −90 to −30 degrees | Rating 1 (out of 5) |

Figure 9B:
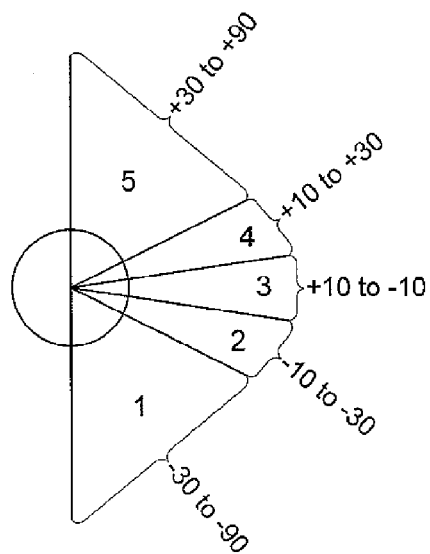
FIG. 9B is a diagram providing an illustration of how palm position data may be converted into control inputs.

The lookup table provided in FIG. 1 allows a viewer 104 to input a ranking on a scale of 1 to 5 by positioning their palm 106 relative to their face. In this particular example, in order to enter a rating of "1", the viewer moves their palm 106 to a position between 30 and 90 degrees below horizontal from their face 110. In order to enter a ranking of "2", the viewer 104 positions their palm 106 between 10 and 30 degrees below horizontal. In order to enter a ranking of "3", the viewer 104 positions their palm 106 between 10 degrees below horizontal and 10 degrees above horizontal. In order to enter a ranking of "4", the viewer 104 may position their palm 106 between 10 and 30 degrees above horizontal with respect to their face 110. In order to enter a ranking of "5", the viewer 104 may position their palm 106 in a location between 30 and 90 degrees above horizontal with respect to their face 110. FIG. 9B illustrates the angles and ranges shown above in Table 1. In some embodiments, the lookup table may be specific to the particular interactive application being executed on the television. Alternatively, the lookup table may be specific to a particular mode of operation. Once the lookup table has been accessed, a ranking for each user input is generated based on the measured angle(s) and the values in the table at block 912.

As discussed above, the embodiment disclosed herein may be implemented with a viewer capture device 204 which lacks facial recognition (as opposed to facial detection) capability because the relative position of the palms 106 of the viewer 104 with respect to their face 110 is used to generate a control input for the television 102. Although the viewer capture device 204 may lack the ability to recognize 110 faces of viewers 104, the television control system 211 may be configured to distinguish between different users of the system by providing a "login mode" which allows viewers 104 to be identified and "login" to the television control system 211 based on the relative positions of their palms 106 and faces 110. Specific angle measurements may be associated with users of the television control system 211. These associations may be stored in a lookup table that maps angle measurement to viewers. An example of a lookup table is provided below in Table 2.

TABLE 2

| Angle Measurement | User |
|---|---|
| −60 to −80 degrees | User 1 |
| −30 to −50 and −90 to −110 degrees | User 2 |
| 0 to +10 and −170 to −180 degrees | User 3 |

Figure 10:
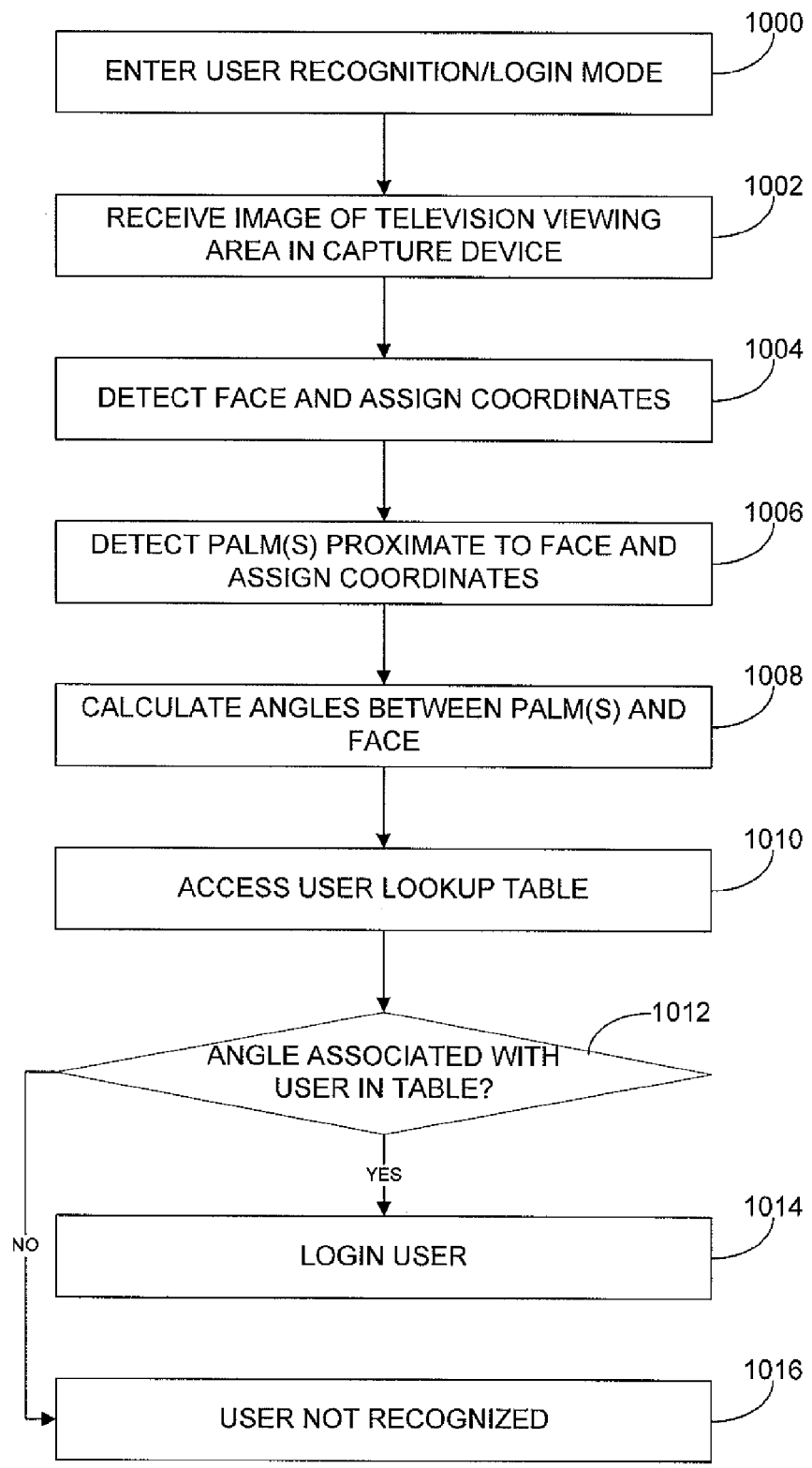
FIG. 10 is a flowchart providing an example of a process by which users may be identified and login to an application based on face and palm position data.

FIG. 10 is a flowchart providing an example of a process by which viewers 104 may be identified by the television control system 211 using a lookup table such as Table 2. The process begins at block 1000, where the system enters a viewer recognition/login mode. This mode may be defined in the mode data 212. Next, at block 1002, the viewer capture device 204 receives an image of the television viewing area 108. Next, the process moves to block 1004, where the system 211 detects faces 110 in the captured image and assigns coordinates to the detected faces. Next, the process moves to block 1006, where the palms 106 proximate to the faces 110 in the captured image are detected and assigned coordinates. Once the faces 110 and palms 106 have been detected and located, the angles between the palms 106 and their respective faces 110 are calculated at block 1008. Next, at block 1010, the lookup table (such as Table 2, for example) is accessed and at decision block 1012, it is determined whether the calculated angle(s) are associated with a user in the table. If the measured angle is associated with a user in the table, the identified user is logged into the system at block 1014. If, however, the measured angles are not recognized, the process moves instead to block 1016, and the user is not logged into the system.

It will be understood by those of skill in the art that numerous and various modifications can be made without departing from the spirit of the present invention. Therefore, it should be clearly understood that the forms of the invention are illustrative only and are not intended to limit the scope of the invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. A method of providing user interaction with a media device, the method comprising:
   capturing an image of a viewing area related to the media device;
   detecting the presence and location of a face and a palm in the captured image of the viewing area;
   assigning a first vector coordinate to a location of a face;
   assigning a second vector coordinate to a location of a palm;
   creating one or more right triangles from the first vector coordinate, the second vector coordinate, and a horizontal line extending from the first vector coordinate;
   applying trigonometric calculations to measure an angle between the location of the face relative to the palm; and
   generating a control input based on the measured angle.

2. The method of claim 1, wherein capturing the image of the viewing area comprises taking a picture of the viewing area using a camera device associated with the media device.

3. The method of claim 2, wherein the camera device is on the media device.

4. The method of claim 1, further comprising:
   storing the captured image as raw data on a memory on the device; and
   converting the raw image data into a bitmapped image.

5. The method of claim 4, wherein the detecting the presence and location of a face and a palm comprises processing the captured image using image processing software.

6. The method of claim 1, wherein the viewing area comprises an area in front of the display of the media device.

7. The method of claim 1, wherein the media device is a television device.

8. The method of claim 1, wherein generating a control input based on the measured angle further comprises:
   accessing a lookup table;
   querying the lookup table for the control input associated with the measured angle; and
   selecting the control input based on the query.

9. The method of claim 1, further comprising:
   after detecting the presence and location of a face and a palm, associating the face with the palm.

10. The method of claim 9, wherein a plurality of faces are detected and a plurality of palms are detected in the image of the viewing area.

11. A media device having machine-executable instructions stored thereon, which when executed by a processor, perform a method of providing user interaction with the media device, the method comprising:
- capturing an image of a viewing area related to the device;
- detecting the presence and location of a face and a palm in the captured image of the viewing area;
- assigning a first vector coordinate to a location of a face;
- assigning a second vector coordinate to a location of a palm;
- creating one or more right triangles from the first vector coordinate, the second vector coordinate, and a horizontal line extending from the first vector coordinate;
- applying trigonometric calculations to measure an angle between the location of the face relative to the palm; and
- generating a control input based on the measured angle.

12. The media device of claim 11, wherein capturing the image of the viewing area comprises taking a picture of the viewing area using a camera device associated with the media device.

13. The media device of claim 12, wherein the camera device is on the media device.

14. The media device of claim 11, further comprising:
- storing the captured image as raw image data on a memory on the device; and
- converting the raw image data into a bitmapped image.

15. The media device of claim 14, wherein the detecting the presence and location of a face and a palm comprises processing the captured image using image processing software.

16. The media device of claim 11, wherein the viewing area comprises an area in front of the display of the media device.

17. The media device of claim 11, wherein the media device is a television device.

18. The media device of claim 11, wherein generating a control input based on the measured angle further comprises:
- accessing a lookup table;
- querying the lookup table for the control input associated with the measured angle; and
- selecting the control input based on the query.

19. The media device of claim 11, further comprising:
- after detecting the presence and location of a face and a palm, associating the face with the palm.

20. The media device of claim 19, wherein a plurality of faces are detected and a plurality of palms are detected in the image of the viewing area.

21. The media device of claim 11, wherein the media device is a television.

22. A media device system comprising,
- a viewer capture module configured to detect a presence and location of hands and faces of viewers in a viewing area;
- a coordinate mapping module configured to receive data from the viewer capture module and generate mapping coordinates related to the detected locations;
- an angle measurement module configured to determine a relative angle between detected hands and faces, wherein said angle measurement module assigns a first vector coordinate to a location of a face, assigns a second vector coordinate to a location of a hand, creates one or more right triangles from the first vector coordinate, the second vector coordinate, and a horizontal line extending from the first vector coordinate, and applies trigonometric calculations to determine the relative angle; and
- a translation module configured to receive the determined relative angle and translate it into a control input.

* * * * *